(12) United States Patent
Merlin et al.

(10) Patent No.: US 8,995,406 B2
(45) Date of Patent: Mar. 31, 2015

(54) SYSTEMS AND METHODS FOR REDUCING COLLISIONS AFTER TRAFFIC INDICATION MAP PAGING

(71) Applicant: QUALCOMM Incorporated, San Diego, CA (US)

(72) Inventors: Simone Merlin, San Diego, CA (US); Alfred Asterjadhi, Breukelen (NL); Maarten Menzo Wentink, Naarden (NL); Santosh Paul Abraham, San Diego, CA (US); Zhi Quan, Livermore, CA (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 13/759,199

(22) Filed: Feb. 5, 2013

(65) Prior Publication Data
US 2013/0201974 A1    Aug. 8, 2013

Related U.S. Application Data

(60) Provisional application No. 61/595,480, filed on Feb. 6, 2012, provisional application No. 61/758,000, filed on Jan. 29, 2013.

(51) Int. Cl.
*H04J 3/00* (2006.01)
*H04W 74/06* (2009.01)
*H04W 74/08* (2009.01)
(Continued)

(52) U.S. Cl.
CPC ............ *H04W 74/06* (2013.01); *H04W 74/085* (2013.01); *H04W 52/0216* (2013.01); *H04W 68/00* (2013.01); *H04W 76/048* (2013.01); *H04W 52/02* (2013.01)

USPC ............ 370/336; 370/328; 370/329; 370/447

(58) Field of Classification Search
CPC .............. H04W 74/06; H04W 74/085; H04W 52/0216
USPC .................. 370/336, 310, 311, 328, 329, 447
See application file for complete search history.

(56) References Cited

U.S. PATENT DOCUMENTS

2005/0009512 A1    1/2005  Rue
2005/0136910 A1*  6/2005  Li et al. .......................... 455/423
(Continued)

FOREIGN PATENT DOCUMENTS

EP    1296484 A1    3/2003
EP    1662709 A1    5/2006

OTHER PUBLICATIONS

International Search Report and Written Opinion—PCT/US2013/024972—ISA/EPO—Aug. 27, 2013.
Liebsch, M., et al., "Utilization of the IEEE 802.11 power save mode with IP paging", Communications, 2005. ICC 2005. 2005 IEEE International Conference on Seoul, Korea May 16-20, 2005, Piscataway, NJ, USA, IEEE, vol. 2, May 16, 2005, pp. 1383-1389, XP010822551, DOI: 10.1109/ICC.2005.1494572 ISBN: 978-0-7803-8938-0 paragraph [00IV].

(Continued)

*Primary Examiner* — Albert T Chou
(74) *Attorney, Agent, or Firm* — Kevin T. Cheatham

(57) ABSTRACT

Systems, methods, and devices for reducing collisions in a wireless communications network are described herein. In some aspects, a processor is configured to decrementing a value of a counter if a channel of a wireless communications network is idle for at least an extended slot time. The processor may be further configured to generate a polling request and allow the transmission of the polling request to an access point over the wireless communications network when the value of the counter reaches a threshold value.

54 Claims, 11 Drawing Sheets

(51) Int. Cl.
*H04W 52/02* (2009.01)
*H04W 68/00* (2009.01)
*H04W 76/04* (2009.01)

(56) References Cited

U.S. PATENT DOCUMENTS

| | | | |
|---|---|---|---|
| 2005/0141543 A1 | 6/2005 | Nishimura | |
| 2006/0193274 A1* | 8/2006 | Yamagata | 370/310 |
| 2007/0058665 A1* | 3/2007 | Ho et al. | 370/447 |
| 2007/0287456 A1 | 12/2007 | Shimizu | |
| 2008/0151814 A1* | 6/2008 | Jokela | 370/328 |
| 2011/0007656 A1 | 1/2011 | He et al. | |
| 2011/0103352 A1 | 5/2011 | Wentink | |
| 2011/0206016 A1 | 8/2011 | Denteneer et al. | |
| 2011/0261740 A1* | 10/2011 | Loc et al. | 370/311 |
| 2011/0305216 A1* | 12/2011 | Seok | 370/329 |
| 2012/0213065 A1 | 8/2012 | Koo et al. | |
| 2013/0329620 A1* | 12/2013 | Kim et al. | 370/311 |

OTHER PUBLICATIONS

Merlin, S., "Lowe power medium access; 11-12-0127-00-00ah-lowe-power-medium-access", IEEE Draft; 11-12-0127-00-00AH-L0we-P0wer-Medium-Access, IEEE-SA Mentor, Piscataway, NJ USA, vol. 802.11ah, Jan. 17, 2012, pp. 1-13, XP017672793, [retrieved on Jan. 17, 2012] the whole document.

Partial International Search Report—PCT/US2013/024972—ISA/EPO—May 3, 2013.

Steenkiste P.A., "18-759: Wireless networks lecture 11:802.11" Departments of Computer Science and Electrical and Computer Engineering. Spring Semester 2012. See slides 3-5 & 21-25. http://www.cs.cmu.edu/~prs/wirelessS12/.

Zhu, Y.H., et al., "Efficient Power Management for Infrastructure IEEE 802.11 WLANs", IEEE Transactions on Wireless Communications, vol. 9, No. 7, Jul. 1, 2010, pp. 2196-2205, XP055060851, ISSN: 1536-1276, DOI: 10.1109/TWC.2010.07.081493 the whole document.

\* cited by examiner

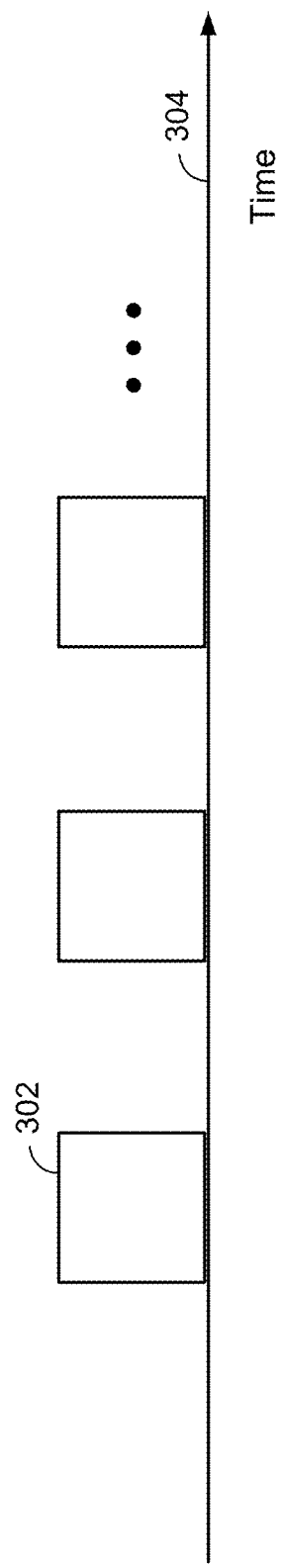

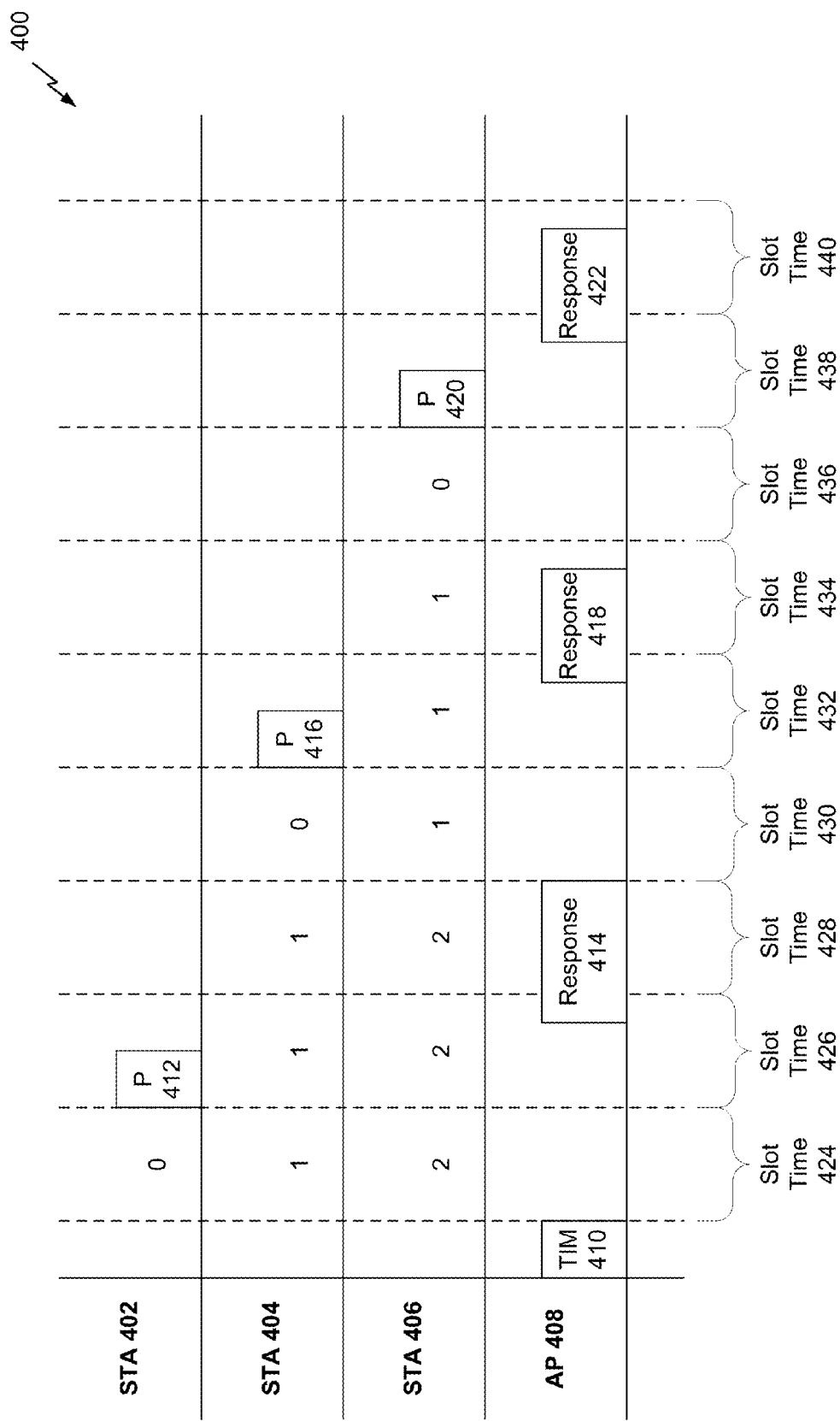

SYSTEMS AND METHODS FOR REDUCING COLLISIONS AFTER TRAFFIC INDICATION MAP PAGING

CROSS-REFERENCE TO RELATED APPLICATIONS

This application claims priority under 35 U.S.C. §119(e) to U.S. Provisional Patent Application No. 61/595,480, filed on Feb. 6, 2012, and U.S. Provisional Patent Application No. 61/758,000, filed on Jan. 29, 2013, entitled "SYSTEMS AND METHODS FOR REDUCING COLLISIONS AFTER TRAFFIC INDICATION MAP PAGING", the entire contents of which disclosure is herewith incorporated by reference.

BACKGROUND

1. Field

The present application relates generally to wireless communications, and more specifically to systems, methods, and devices for performing collision avoidance in a wireless communication network.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. Further, devices that are not actively transmitting/receiving information in the wireless network may enter a doze state, to conserve power, where the devices do not actively transmit/receive information in the doze state. These devices may further utilize paging messages to determine when to wake up from a doze state and enter an awake state in order to transmit/receive data. Thus, improved systems, methods, and devices for reducing collisions are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved paging for devices in a wireless network.

One aspect of this disclosure provides a wireless communications device. The wireless communications device comprises a memory configured to store a value of a counter. The wireless communications device further comprises a processor coupled to the memory. The processor is configured to decrement the value of the counter if a channel of a wireless communications network is idle for at least an extended slot time. A starting value of the counter is based on a position of an index corresponding to the wireless communications device in an information element. The processor is further configured to generate a polling request. The polling request is transmitted to an access point over the wireless communications network when the value of the counter reaches a threshold value.

Another aspect of this disclosure provides a method for reducing collisions in a wireless communications network. The method comprises decrementing a value of a counter if a channel of a wireless communications network is idle for at least an extended slot time. A starting value of the counter is based on a position of an index corresponding to a wireless communications device in an information element. The method further comprises generating a polling request. The method further comprises transmitting the polling request to an access point over the wireless communications network when the value of the counter reaches a threshold value.

Another aspect of this disclosure provides an apparatus configured to reduce collisions in a wireless communications network. The apparatus comprises means for decrementing a value of a counter if a channel of a wireless communications network is idle for at least an extended slot time. A starting value of the counter is based on a position of an index corresponding to a wireless communications device in an information element. The apparatus further comprises means for generating a polling request. The apparatus further comprises means for transmitting the polling request to an access point over the wireless communications network when the value of the counter reaches a threshold value.

Another aspect of this disclosure provides a non-transitory computer readable medium comprising instructions or code that, when executed, causes an apparatus to decrement a value of a counter if a channel of a wireless communications network is idle for at least an extended slot time. A starting value of the counter is based on a position of an index corresponding to a wireless communications device in an information element. The medium further comprises code that, when executed, causes the apparatus to generate a polling request. The medium further comprises code that, when executed, causes the apparatus to transmit the polling request to an access point over the wireless communications network when the value of the counter reaches a threshold value.

Another aspect of this disclosure provides a wireless communications device. The wireless communications device comprises a receiver configured to detect messages transmitted on a channel of a wireless communications network. The wireless communications device further comprises a processor coupled to the receiver. The processor is configured to generate a polling request. The processor is further configured to determine an adaptive enhanced inter-frame space (AEIFS) each time the wireless communications device detects another message transmitted on the channel of the wireless communications network in which the wireless communications device communicates. An initial duration of the AEIFS is based on a position of the wireless communication device in an information element. The polling request is transmitted to an access point over the wireless communications network after a time based on a duration of the AEIFS and when the channel of the wireless communications network is open.

Another aspect of this disclosure provides a method for reducing collisions in a wireless communications network. The method comprises generating a polling request. The method further comprises determining an adaptive enhanced inter-frame space (AEIFS) each time a wireless communications device detects another message transmitted on a channel of a wireless communications network in which the wireless communications device communicates. An initial duration of the AEIFS is based on a position of the wireless communication device in an information element. The method further comprises transmitting the polling request to an access point over the wireless communications network after a time based on a duration of the AEIFS and when the channel of the wireless communications network is open.

Another aspect of this disclosure provides an apparatus configured to reduce collisions in a wireless communications network. The apparatus comprises means for generating a polling request. The apparatus further comprises means for determining an adaptive enhanced inter-frame space (AEIFS) each time a wireless communications device detects another message transmitted on a channel of a wireless communications network in which the wireless communications device communicates. An initial duration of the AEIFS is based on a position of the wireless communication device in an information element. The apparatus further comprises means for transmitting the polling request to an access point over the wireless communications network after a time based on a duration of the AEIFS and when the channel of the wireless communications network is open.

Another aspect of this disclosure provides a non-transitory computer readable medium comprising instructions or code that, when executed, causes an apparatus to generate a polling request. The medium further comprises code that, when executed, causes an apparatus to determine an adaptive enhanced inter-frame space (AEIFS) each time a wireless communications device detects another message transmitted on a channel of a wireless communications network in which the wireless communications device communicates. An initial duration of the AEIFS is based on a position of the wireless communication device in an information element. The medium further comprises code that, when executed, causes an apparatus to transmit the polling request to an access point over the wireless communications network after a time based on a duration of the AEIFS and when the channel of the wireless communications network is open.

BRIEF DESCRIPTION OF THE DRAWINGS

FIG. 3 illustrates a plurality of partitioned paging messages transmitted by an access point to wireless stations in the wireless communication system of FIG. 1.

FIG. 4 illustrates an exemplary polling request mechanism.

DETAILED DESCRIPTION

Figure 1:
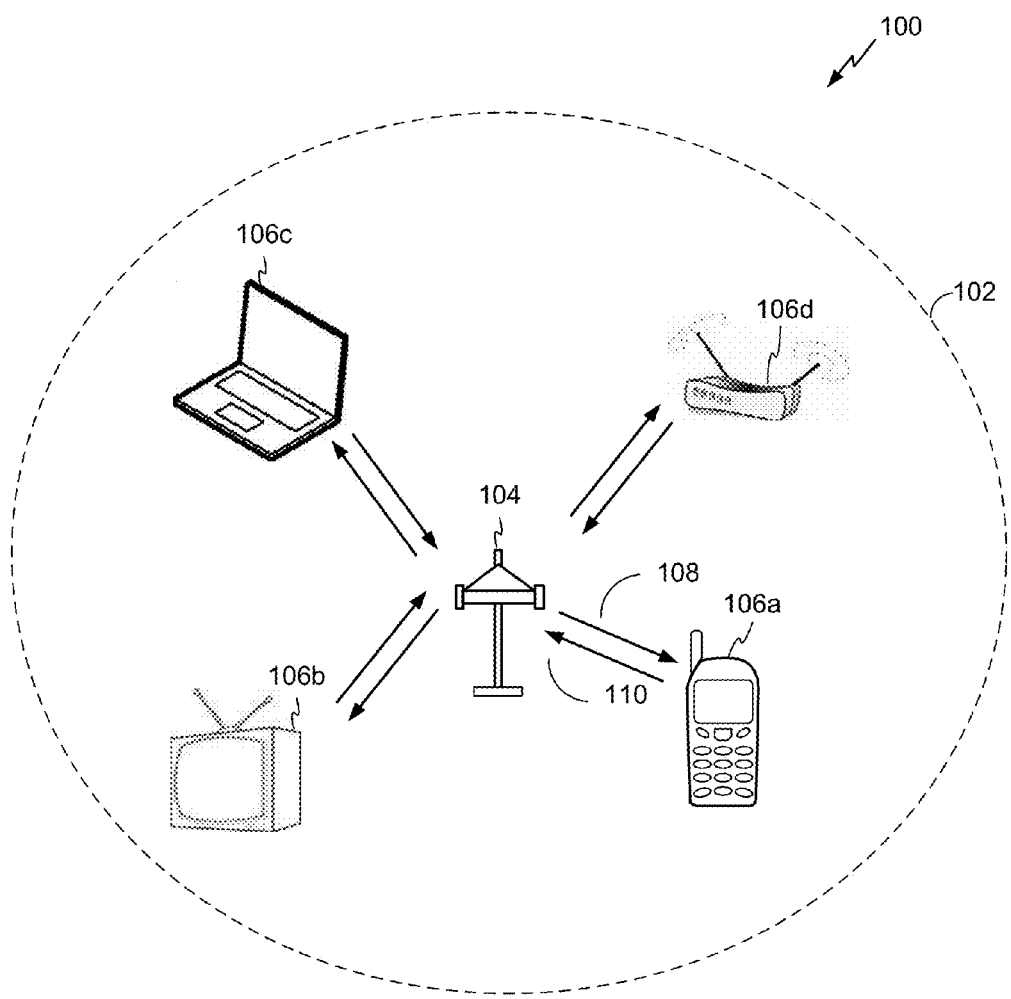
FIG. 1 shows an exemplary wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an exemplary wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The AP 104 may transmit a beacon signal (or simply a "beacon"), via a communication link such as the downlink 108, to other nodes STAs 106 of the system 100, which may help the other nodes STAs 106 to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g. shared) amongst several devices, and information specific to a given device.

In some aspects, a STA 106 may be required to associate with the AP 104 in order to send communications to and/or receive communications from the AP 104. In one aspect, information for associating is included in a beacon broadcast by the AP 104. To receive such a beacon, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

Figure 2:
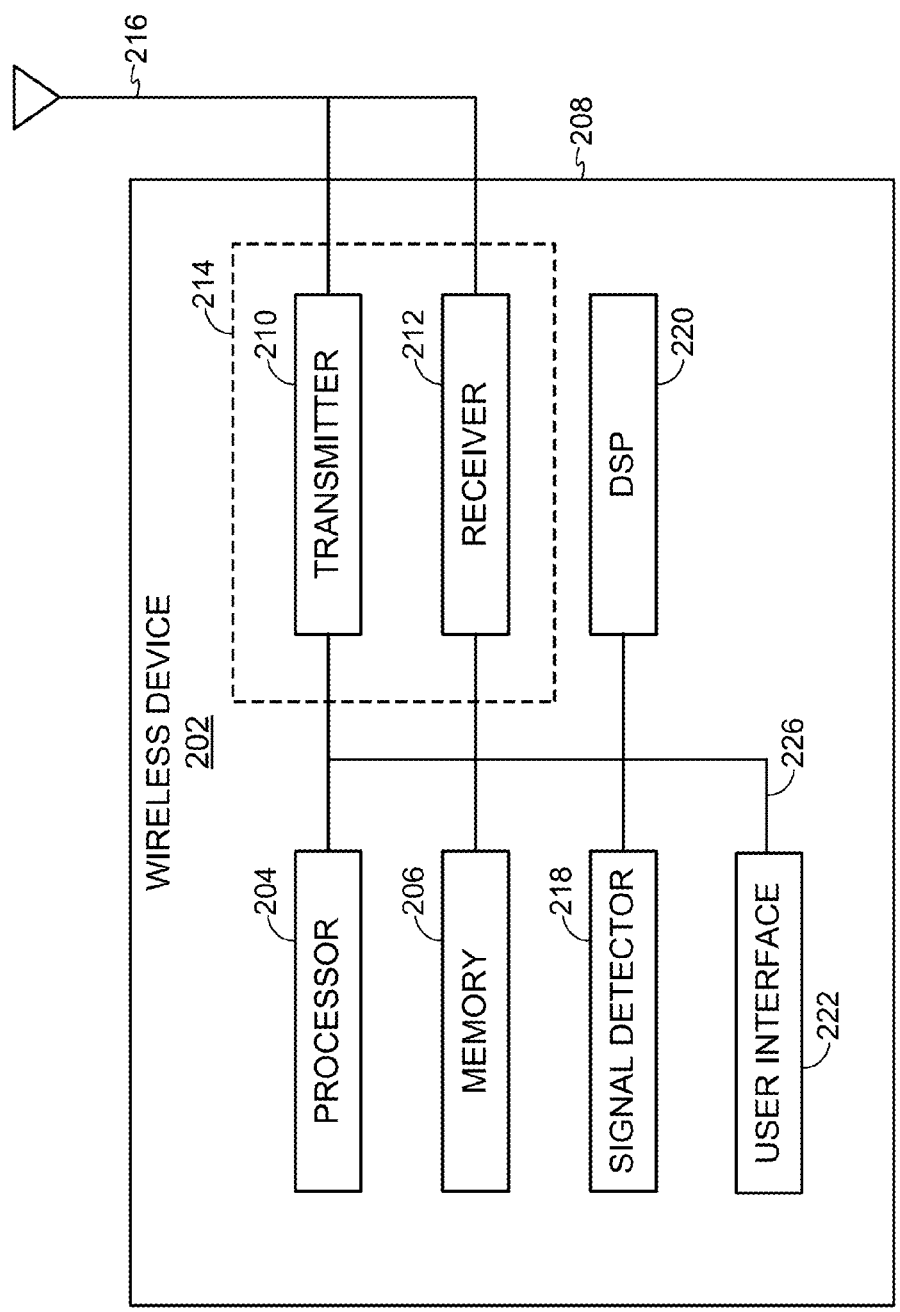
FIG. 2 shows a functional block diagram of an exemplary wireless device that may be employed within the wireless communication system of FIG. 1.

FIG. 2 shows an exemplary functional block diagram of a wireless device 202 that may be employed within the wireless communication system 100 of FIG. 1. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit messages, which may be referred to as "paging messages" that are configured to indicate to wireless devices whether or not the wireless devices need to wake up from a doze state and enter an awake state as discussed below. For example, the transmitter 210 may be configured to transmit paging messages generated by the processor 204, discussed above. When the wireless device 202 is implemented or used as a STA 106, the processor 204 may be configured to process paging messages. When the wireless device 202 is implemented or used as an AP 104, the processor 204 may also be configured to generate paging messages.

The receiver 212 may be configured to wirelessly receive paging messages.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

The wireless device 202 may comprise an AP 104 or an STA 106, and may be used to transmit and/or receive communications including paging messages. That is, either AP 104 or STA 106 may serve as transmitter or receiver devices of paging messages. Certain aspects contemplate signal detector 218 being used by software running on memory 206 and processor 204 to detect the presence of a transmitter or receiver.

The STA 106 may have a plurality of operational modes. For example, the STA 106 may have a first operational mode referred to as an active mode. In the active mode, the STA 106 may always be in an "awake" state and actively transmit/receive data with the AP 104. Further, the STA 106 may have a second operational mode referred to as a power save mode. In the power save mode, the STA 106 may be in the "awake" state or a "doze" or "sleep" state where the STA 106 does not actively transmit/receive data with the AP 104. For example, the receiver 212 and possibly DSP 220 and signal detector 218 of the STA 106 may operate using reduced power consumption in the doze state. Further, in the power save mode, the STA 106 may occasionally enter the awake state to listen to messages from the AP 104 (e.g., paging messages) that indicate to the STA 106 whether or not the STA 106 needs to "wake up" (e.g., enter the awake state) at a certain time so as to be able to transmit/receive data with the AP 104.

Accordingly, in certain wireless communication systems 100, the AP 104 may transmit paging messages to a plurality of STAs 106 in a power save mode in the same network as the AP 104, indicating whether or not there is data buffered at the AP 104 for the STAs 106. The STAs 106 may also use this information to determine whether they need to be in an awake state or a doze state. For example, if an STA 106 determines it is not being paged, it may enter a doze state. Alternatively, if the STA 106 determines it may be paged, the STA 106 may enter an awake state for a certain period of time to receive the page and further determine when to be in an awake state based on the page. Further, the STA 106 may stay in the awake state for a certain period of time after receiving the page. In another example, the STA 106 may be configured to function in other ways when being paged or not being paged that are consistent with this disclosure.

In some aspects, paging messages may comprise a bitmap (not shown in this figure), such as a traffic identification map (TIM). In certain such aspects, the bitmap may comprise a number of bits. These paging messages may be sent from the AP 104 to STAs 106 in a beacon or a TIM frame. Each bit in the bitmap may correspond to a particular STA 106 of a plurality of STAs 106, and the value of each bit (e.g., 0 or 1) may indicate the state the corresponding STA 106 should be in (e.g., doze state or awake state). Accordingly, the size of the bitmap may be directly proportional to the number of STAs 106 in the wireless communications system 100. Therefore, a large number of STAs 106 in the wireless communications system 100 may result in a large bitmap.

FIG. 3 illustrates a plurality of partitioned paging messages 302 transmitted by the AP 104 to STAs 106 in the wireless communication system 100 of FIG. 1. As shown, time increases horizontally across the page over the time axis 304. As shown, the AP 104 is configured to transmit a plurality of paging messages 302. The paging messages 302 may be sent in a TIM frame, a beacon, or using some other appropriate signaling. The STAs 106 may be configured to listen to one or more of the paging messages 302. Following the one or more paging messages 302, the STAs 106 may be configured to transmit requests to the AP 104 and receive a response from the AP 104.

The paging process may result in a high number of STAs 106 receiving the one or more paging messages 302. For example, a high number of STAs 106 in the same TIM may receive the one or more paging messages 302, which may lead to one or more STAs 106 contending to transmit requests to the AP 104 on the medium after the TIM. Accordingly, collisions resulting in corrupted data received by the AP 104 may occur in situations in which at least two STAs 106 attempt to transmit requests to the AP 104 at or nearly at a same time.

FIG. 4 illustrates a polling request mechanism 400. The polling request mechanism 400 shown may be used by the AP 104 and the STAs 106 in the wireless communication system 100 of FIG. 1. As shown, time increases horizontally across the page from slot time 424 to slot time 440.

In general, after the transmission of a paging message, such as TIM 410, a time interval is reserved for the paged STAs 106. The reservation may be achieved by transmitting a message (e.g., a paging message, an additional message, etc.) to cause non-paged STAs to defer access to the medium for the duration of the reserved period. In some implementations, the deferred access can be achieved by setting a duration field value of the PPDU of a reserving frame (e.g., the paging message, the additional message, etc.), which prompts the non-paged STAs to set their network allocation vector (NAV). The PPDU of the reserving frame may carry an information element (e.g., the bitmap described above). In other implementations, the deferred access can be achieved by sending an additional frame preceding or following the paging frame, where the additional frame indicates the duration of the reserved period.

During the reserved time interval, the paged STAs 106 can send requests to the AP 104 (e.g., Power Saving polls (PS-POLL) requests 412, 416, and 420) and receive a response from the AP 104 (e.g., response 414, 418, and 422). Multiple paged STAs 106 can contend during the reserved time interval in accordance with various methods, as described herein. In some embodiments, STAs 106 that have not been paged cannot contend during the reserved time interval. Once the reserved time interval is over, STAs 106 can start contending to send the requests to the AP 104. In an embodiment, the AP 104 may determine the duration of the reserved time interval. The reserved time interval should be sufficient for all the paged STAs 106 to send requests to the AP 104 and receive a response from the AP 104. By way of example, and not limitation, the duration of the reserved time interval may be a function of the number of paged STAs 106.

The polling request mechanism 400 illustrates an embodiment in which STAs 402, 404, and 406 can transmit requests, like PS-POLLs 412, 416, and 420, to AP 408 in such a way so as to avoid collisions. STAs 402, 404, and 406 may be similar to STAs 106 as described herein. In some embodiments, the STAs 402, 404, and 406 may transmit requests to the AP 408 in a certain order. AP 408 may be similar to AP 104 as described herein. The paging message, such as TIM 410, may implicitly or explicitly define an ordering for the STAs 402, 404, and 406. For example if the TIM 410 bitmap indicates that both STA 402 and STA 404 are paged, then the TIM 410 bitmap also implicitly or explicitly indicates whether STA 402 is before or after STA 404. In an example, the order could be determined by the order in which the paged STAs appear in the bitmap representation. Consider a bitmap {0, 1, 0, 0, 1, 1}, where the STA associated with the bit in position 2 is assumed to be before the STA associated with the bit in position 5. In some implementations, the compressed bitmap may be expressed as list of STA identifiers. In this case the sequence in which the STA identifiers appear in the list may determine the order. Consider the list {13, 25, 5, 22}, where the STA associated with identifier "13" is assumed to come before STA identified by "5." In another aspect, the order may be derived from the value of the STA identifier irrespective of the message representation.

In some implementations, the position of the STA 402, 404, or 406 within the TIM 410 bitmap sequence may be a function of the position of the STA 402, 404, or 406 as described above. The order may further be dependent on other indications, the indications being either included in the paging message or assumed to be known at the STAs 402, 404, and/or 406. For example, the indication may include the Timing Synchronization Function (TSF) within the paging message (e.g. TIM 410). In such an implementation, the first STA may be the one whose identifier is set to "1" and has a position within the TIM 410 bitmap sequence which is first in the order after the position associated with the 12 least significant bits (LSBs) of the TSF. Many other functions incorporating various indications can be included to achieve a similar result as that based on the TSF. One beneficial result of including the TSF in the computation of the order is that the order may be changed at each transmission, provided that the portion of the used TSF is different at each transmission.

In some implementations, the sender of the paging message may determine the order of the paged STAs according to any criteria including the usage of the ordering information. For example the sender, AP 408, may order the STAs 402, 404, and 406 based on their QoS requirements, power saving requirements, or other performance parameters. It may be desirable in some implementation for the sender of the paging message to include in the message an explicit indication of the order. This explicit indication of the order may not be based on the TIM 410 bitmap, but rather on other factors as described herein.

For illustrative purposes only, and not meant to be limiting, FIG. 4 depicts an order of STA 402, STA 404, and then STA 406. While STA 402 may be the first STA to transmit a request to the AP 408, the STA 402 may not do so immediately after the TIM 410. Each of STAs 402, 404, and 406 may be configured to use a carrier sense multiple access with collision avoidance (CSMA/CA) based medium access procedure, such as the distributed coordination function (DCF) or the enhanced distributed channel access (EDCA) as defined in the IEEE 802.11 standard. In such a medium access mechanism, a STA 402, 404, or 406 that wants to access the medium for the transmission of a frame initializes a back-off counter. The back-off counter may be initialized with a random number chosen in an appropriate interval. For example, an appropriate interval may be a value between 0 and a duration of a contention window (CW). The back-off counter may be decremented while the transmission medium (e.g. channel) is idle—in other words, no activity is detected on the transmission medium. The transmission medium may be considered to be idle if no activity is detected for a distributed inter-frame space (DIFS) or an arbitration inter-frame space (AIFS) interval. After the medium has been idle for a DIFS or AIFS interval of time, the back-off counter may be decremented by one unit per each additional consecutive idle interval of a duration equal to a slot time. When activity is detected on the medium, the back-off countdown may be frozen and restarted when the medium becomes idle again, as described herein. The STAs 402, 404, and 406 may transmit a packet on the medium when the back-off counter reaches zero or any other integer that represents a lowest value of the counter. In some implementations the DIFS interval may be defined as $$DIFS=SIFS+(2*\text{slot time}) \quad (1)$$

where SIFS is a short inter-frame space. The AIFS interval may be defined as $$AIFS=SIFS+(n*\text{slot time}) \quad (2)$$

where n is greater than or equal to 2.

Each of STAs 402, 404, and 406 may be configured to use a deterministic back-off value to initialize a back-off counter, where an initial value of the back-off counter may be based on the order of the paged STAs 402, 404, and 406. For example, an initial value of the back-off counter for STA 402 may be 1, an initial value of the back-off counter for STA 404 may be 2, and an initial value of the back-off counter for STA 406 may be 3. In this way, an initial value of the back-off counter may be different for each STA 402, 404, and 406 so as to allow each STA 402, 404, and 406 to access the medium in different time instants.

In some implementations, the back-off counter for each STA 402, 404, and 406 may decrement the back-off value when the channel over which the STAs 402, 404, and 406 communicate with the AP 408 is idle for the duration of a slot time 424, 426, 428, 430, 432, 434, 436, 438, and 440. As an example, a regular slot time may be a slot time defined in the IEEE 802.11 standard or a similar CSMA/CA protocol. The STAs 402, 404, and/or 406 may be configured to transmit a PS-POLL request 412, 416, and/or 420 when their respective back-off value reaches zero or any other integer that represents a lowest value of the counter.

In some implementations, the paged STAs 402, 404, and/or 406 may perform the back-off procedure by using a DIFS, an AIFS, and a slot time that are defined differently than the definitions found in the IEEE 802.11 standard. In an embodiment, slot times 424, 426, 428, 430, 432, 434, 436, 438, and 440 may be defined as extended slot times (hereinafter referred to as "slot times"). Extended slot times may be at least as long in duration as the time it takes for a STA 402, 404, or 406 to transmit a PS-POLL request 412, 416, or 420 and for the STA 402, 404, or 406 to receive a beginning of a response 414, 418, or 422. For example, an extended slot time may be the sum of the time it takes for a STA 402, 404, or 406 to transmit a PS-POLL request 412, 416, or 420, the SIFS time, and the clear channel assessment (CCA) time. In other words, the extended slot may be defined as $$\text{extended slot time}=\text{PS-POLL time}+SIFS+CCA\text{ time} \quad (3)$$

As an example, the extended slot time may be a multiple of a regular slot time, where the regular slot time is defined by the IEEE 802.11 standard. For example, $$\frac{\text{extended slot time}}{\text{regular slot time}}=K \quad (4)$$

where K is an integer. In an embodiment, the DIFS or AIFS interval duration used by the paged STAs 402, 404, and/or 406 may be the same or nearly the same as the duration as defined by the IEEE 802.11 standard. For example, the DIFS or AIFS interval duration used by the paged STAs 402, 404, and/or 406 may be defined as in Equations (1) and (2) above. In another embodiment, the DIFS or AIFS interval duration used by the paged STAs 402, 404, and/or 406 may be equal to zero. In this case, the back-off counter may be decremented by one unit per each consecutive idle interval of a duration equal to an extended slot time, without waiting for a DIFS or AIFS interval. In another embodiment, the DIFS or AIFS interval duration used by the paged STAs 402, 404, and/or 406 may be defined in terms of the extended slot time. For example, $$AIFS=SIFS+(n*\text{extended slot time}) \quad (5)$$

$$DIFS=SIFS+(2*\text{extended slot time}) \quad (6)$$

In this way, the wireless communications system may be able to reduce the likelihood of collisions, even if the system contains hidden nodes. Hidden nodes are those STAs that are not within range of each other, and so are not aware of the other STAs' existence, yet are in range of the AP. While a hidden node may not sense a PS-POLL request transmitted by one STA, the hidden node will sense a response transmitted by the AP 408. By ensuring that the extended slot time is at least as long in duration as described herein, even hidden nodes will not decrement their back-off values until the appropriate time, thereby increasing the likelihood of avoiding collisions.

As described herein, the extended slot time may be defined as a multiple of a regular slot time, and the DIFS or AIFS interval may be the same as is defined in the IEEE 802.11 standard. As an example, the back-off procedure used by a paged STA 402, 404, and/or 406 may be implemented by using a regular back-off procedure. A STA 402, 404, and/or 406 may set the initial value, i, of the regular back-off counter as follows:

$$i=K*N_i \quad (7)$$

where K is as defined in Equation (4) and $N_i$ may be a random integer between 0 and a duration of a CW or may be deterministically assigned based on the STA 402, 404, and/or 406 position in the paging messaged as described herein. After the medium has been idle for a DIFS or AIFS interval of time, the back-off counter is decremented by K units per each additional consecutive idle interval of a duration equal to an extended slot time. When activity is detected on the medium, the back-off countdown is frozen and is restarted when the medium becomes idle again, as described herein. The STA 402, 404, or 406 transmits a packet on the medium when the back-off reaches zero or any other integer that represents a lowest value of the counter.

As shown in FIG. 4, AP 408 may complete the transmission of TIM 410 just before the beginning of slot time 424 (e.g., an enhanced slot time as defined herein). Because the channel is idle for the duration of slot time 424, the back-off counter for each of STAs 402, 404, and 406 may decrease the back-off value. For example, the back-off counter for each of STAs 402, 404, and 406 may decrement their back-off value by 1, such that the back-off value of STA 402 is 0, the back-off value of STA 404 is 1, and the back-off value of STA 406 is 2. Since the back-off value for STA 402 is 0, STA 402 may transmit a PS-POLL request 412 in the next slot time, slot time 426. Since STA 402 transmits a PS-POLL request and the AP 408 transmits a response 414, neither the STA 404 back-off counter nor the STA 406 back-off counter decrements the back-off value. Note further that a detection of a PS-POLL request or a detection of an AP response may be sufficient to cause the STA 404 back-off counter and the STA 406 back-off counter to maintain their respective back-off values. In this way, even if STA 404 and/or STA 406 is a hidden node, the back-off values will not be decremented.

STAs 404 and 406 maintain the back-off values during slot time 428 as well because both STAs detect the transmission of response 414 by AP 408. During slot time 430, the channel is once again idle. Both the STA 404 back-off counter and the STA 406 back-off counter decrement their respective back-off values, such that the back-off value for STA 404 is now 0 and the back-off value for STA 406 is now 1.

In slot time 432, STA 404 transmits a PS-POLL request 416 to the AP 408 and the process repeats as described herein until the STA 406 back-off value reaches 0 and it transmits a PS-POLL request 420. If a STA 402, 404, and/or 406 fails to transmit a PS-POLL 412, 416, and/or 420 during its allotted time, the subsequent STAs later in the order of STAs may continue to decrement their back-off value since the channel will instead be idle for at least a duration of the extended slot time. In this way, delay of the wireless communications system may be reduced or minimized.

In other implementations, not shown, each STA 402, 404, and 406 may be in a sleep mode for a period of time before waking. The sleep time may be determined based on a position of the STA 402, 404, and 406 in the TIM 410 bitmap sequence and/or an estimation of data sent by the AP 408. After the STA 402, 404, or 406 has waken and the medium has been idle for a DIFS or AIFS interval of time, the back-off counter is decremented by K units per each additional consecutive idle interval of a duration equal to an extended slot time. When activity is detected on the medium, the back-off countdown is frozen and is restarted when the medium becomes idle again, as described herein. The STA 402, 404, or 406 transmits a packet on the medium when the back-off reaches zero or any other integer that represents a lowest value of the counter. In another implementation, not shown, each STA 402, 404, and 406 may start the back-off counter at a time randomly selected over a given time interval. In still another implementation, not shown, each STA 402, 404, and 406 may transmit at a time n*X where n identifies a particular STA and X is a function of the TIM 410 bitmap sequence.

Figure 5A:
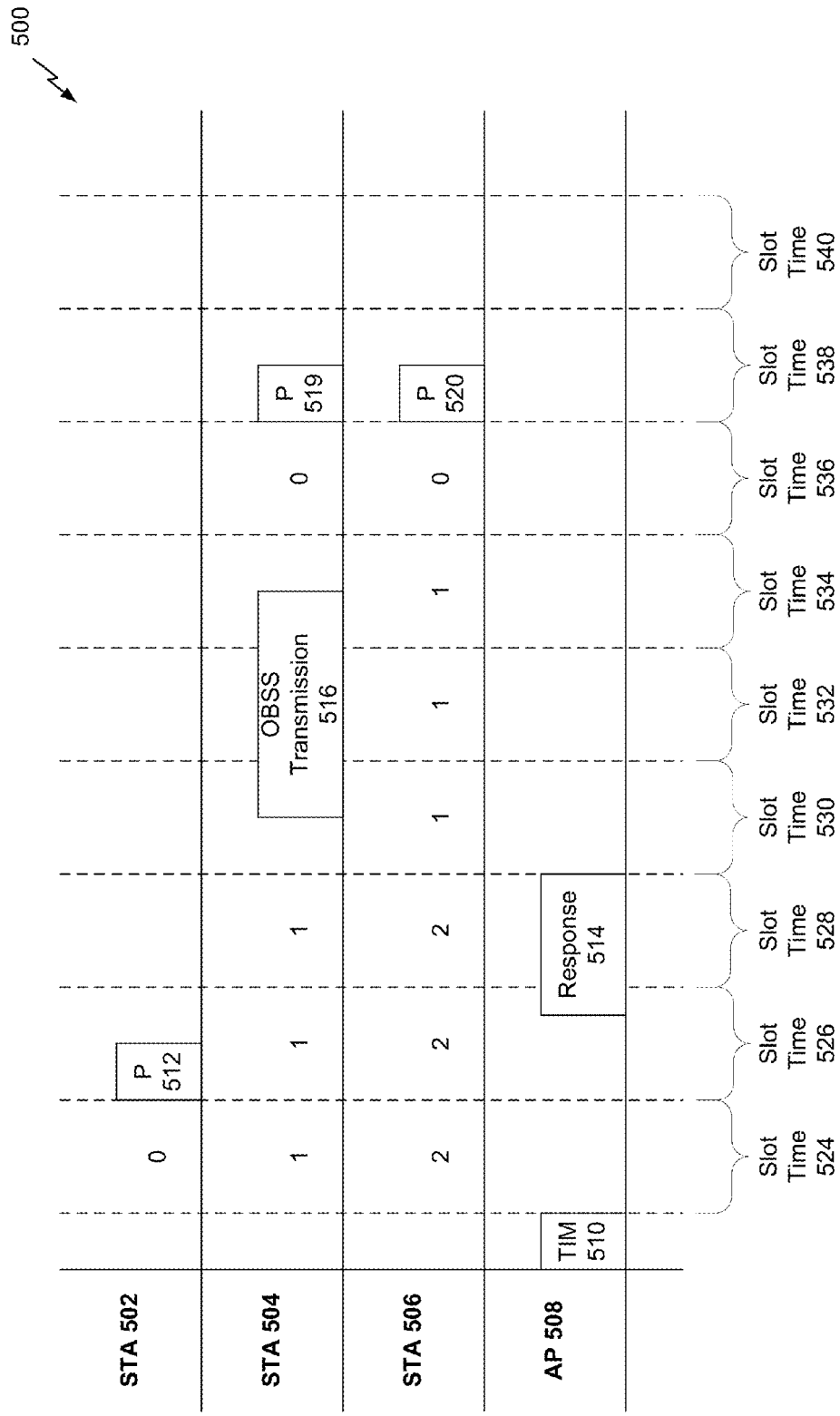
FIG. 5A illustrates another polling request mechanism.

FIG. 5A illustrates a polling request mechanism 500. The polling request mechanism 500 shown may be used by the AP 104 and the STAs 106 in the wireless communication system 100 of FIG. 1. The polling request mechanism 500 is similar to the polling request mechanism 400 of FIG. 4. However, in the polling request mechanism 500, an overlapping basic service set (OBSS) transmission 516 occurs. An OBSS transmission 516 may occur if a STA, such as STA 404, identifies with two or more basic service sets, where each basic service set include an AP and associated STAs. The OBSS transmission 516 may originate from an AP other than AP 508.

In some implementations, if STA 504 receives an OBSS transmission 516, the STA 504 back-off counter may not decrement the back-off value until the OBSS transmission 516 is complete. For example, as illustrated in FIG. 5, OBSS transmission 516 may not be complete until during slot time 534 such that the STA 504 back-off counter decrements the back-off value during slot time 536, the next slot time in which the channel is idle. However, the STA 506 back-off counter may decrement the back-off value during slot time 530 because STA 506 does not detect any transmission on the channel. For example, STA 506 may determine that the channel is idle for the duration of slot time 530 because it is not part of the basic service set for which the OBSS transmission 516 was intended. This may result in a situation in which two or more STAs, like STA 504 and STA 506, attempt to transmit a PS-POLL request 519 and 520 at or nearly at a same time and cause a collision.

Figure 5B:
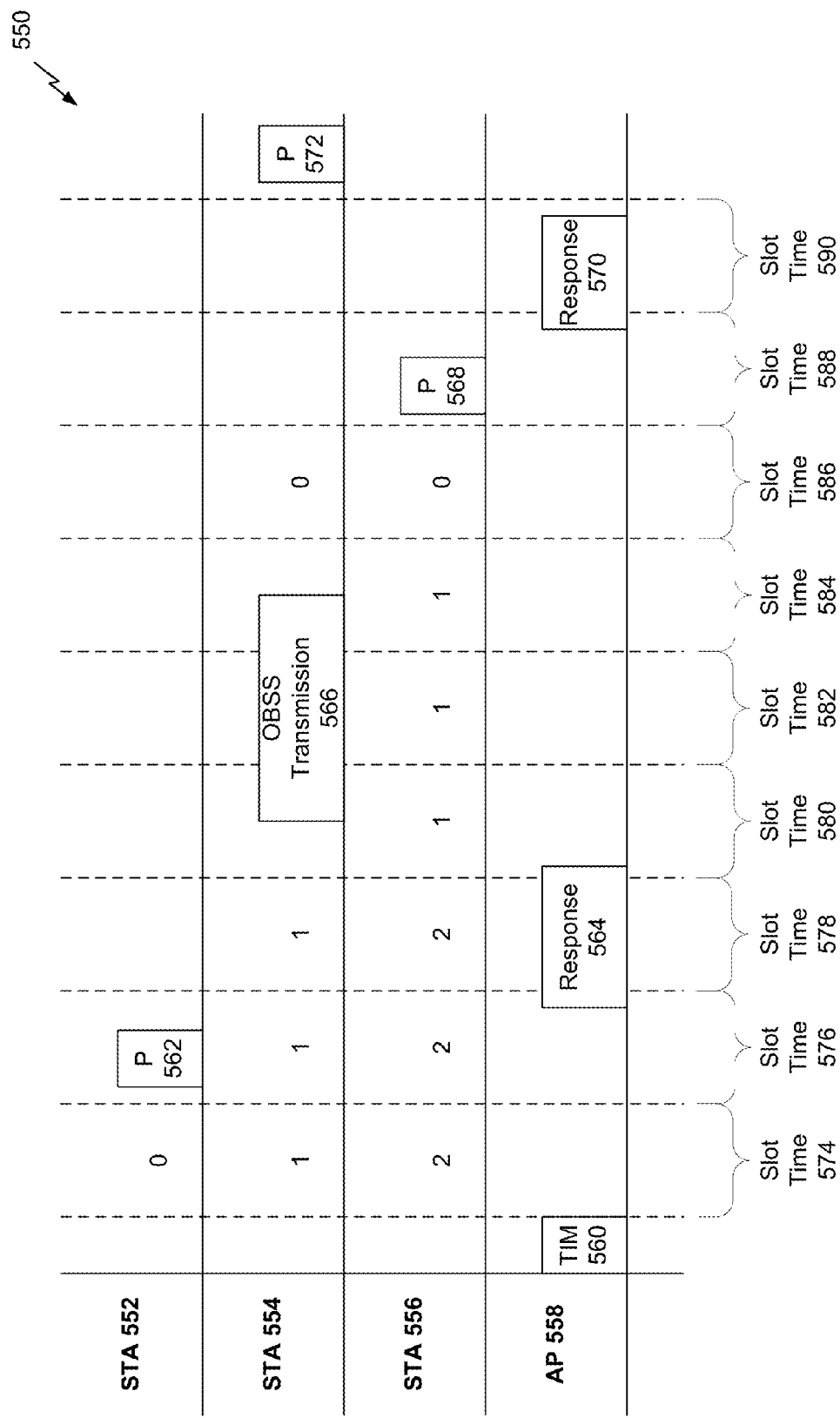
FIG. 5B illustrates another exemplary polling request mechanism.

FIG. 5B illustrates a polling request mechanism 550. The polling request mechanism 550 may reduce the likelihood of a collision occurring as illustrated in FIG. 5A with respect to the polling request mechanism 500. The polling request mechanism 550 is similar to the polling request mechanism 400 of FIG. 4 and the polling request mechanism 500 of FIG. 5A. However, in the polling request mechanism 550, the STAs 552 and 556 do not transmit a PS-POLL request 562 and 568 at the end of extended slot time 574 or 586. Rather, at the end of the slot times 574 and 586, the STAs 552 and 556 start an additional short back-off procedure. The additional short back-off procedure is based on regular (non-extended) slot times such that a maximum back-off time if the medium was idle would be shorter than an extended slot time. For example, like STA 504, STA 554 may receive an OBSS transmission 566. While both STA 554 and STA 556 may have a back-off value equal to zero during extended slot time 586, a collision may be avoided.

In some implementations, the additional back-off counter may be initialized with a random number or it may be based on a deterministic value, like a deterministic back-off value as described herein. Thus, the duration may be based on how the STAs 552, 554, and 556 are ordered in the TIM 560 bitmap sequence. As an example, the back-off procedure used by a paged STA 552, 554, and/or 556 may be implemented by using the regular back-off procedure. A STA 552, 554, or 556 may set the initial value, i, of the regular back-off counter as follows:

$$i=(K*N_i)+M_i \qquad (8)$$

where K is as defined in Equation (4), $N_i$ may be a random integer between 0 and a duration of a CW or may be deterministically assigned based on the STA 402, 404, and/or 406 position in the paging messaged as described herein, and $M_i$ may be a random integer between 0 and a duration of a CW' or may be deterministically determined based on the STA 402, 404, and/or 406 position in the paging message as described herein. After the medium has been idle for a DIFS or AIFS interval of time, the back-off may be decremented by K units per each additional consecutive idle interval of a duration equal to an extended slot time. In an embodiment, if the back-off counter value is less than or equal to $M_i$, then the back-off counter is decremented by 1 unit per each additional consecutive idle interval of a duration equal to a regular slot time. When activity is detected on the medium, the back-off countdown is frozen and is restarted once the medium becomes idle again, as described herein. The STA 402, 404, or 406 transmits a packet on the medium when the back-off counter reaches zero or any other integer that represents a lowest value of the counter.

In some implementations, the extended slot time may be the sum of the time it takes for a STA 552, 554, or 556 to transmit a PS-POLL request 562, 568, or 572, the short interframe space (SIFS) time, the clear channel assessment (CCA) time, and a maximum contention window time. In an embodiment, the maximum contention window time may be a maximum number of regular slot times that a residual back-off may have (i.e., a maximum value of $M_i$).

Because STA 554 and STA 556 may have different additional back-off periods (e.g. because both STAs may have different initial residual back-off values), one of STA 554 and STA 556 may transmit a PS-POLL request before the other. As shown in FIG. 5B, STA 556 transmits PS-POLL request 568 during slot time 588 after the additional back-off period has passed, where the additional back-off period begins at the beginning of slot time 588. The additional back-off period for STA 554 also passes during slot time 588. However, because STA 554 detects the PS-POLL request 568 transmitted by STA 556, STA 554 waits at least an additional slot time before attempting to transmit the PS-POLL request 572 once again. Since the channel is busy until after slot time 590, STA 554 transmits PS-POLL request 572 after slot time 590 and after its additional back-off period has passed.

In other implementations, collisions may still occur. In such situations, a STA may transition into a sleep mode and attempt to transmit a request to the AP during the next reserved time interval or after the current reserved time interval has expired. In this way, while a delay of the wireless communications system may be increased, energy consumption may be decreased.

Figure 6:
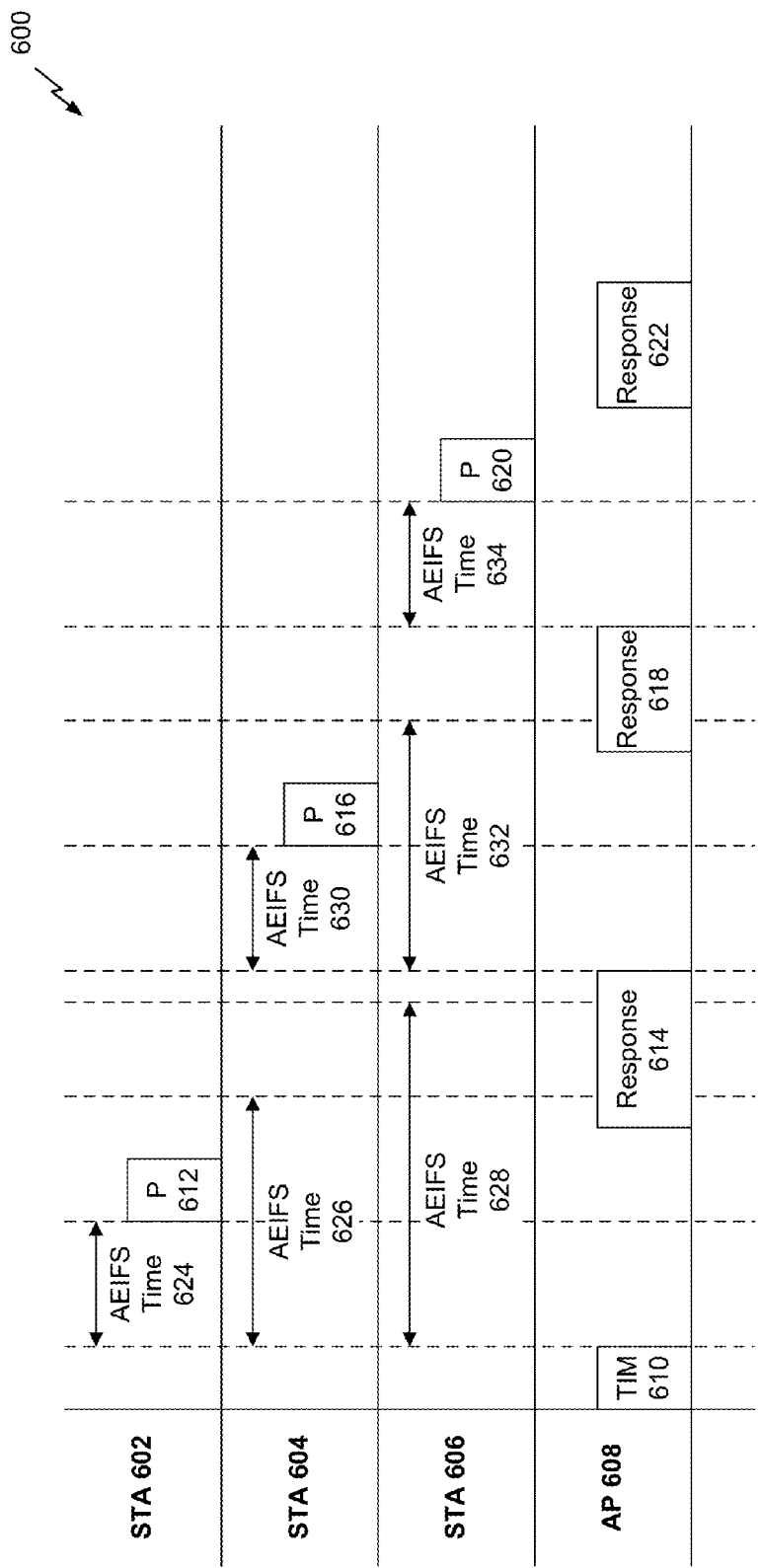
FIG. 6 illustrates another exemplary polling request mechanism.

FIG. 6 illustrates a polling request mechanism 600. The polling request mechanism 600 shown may be used by the AP 104 and the STAs 106 in the wireless communication system 100 of FIG. 1. Unlike the polling request mechanisms 400, 500, and 550, an extended slot time may not be defined, yet the likelihood of collisions may still be reduced.

As shown in FIG. 6, each STA 602, 604, and 606 waits at least an adaptive enhanced inter-frame space (AEIFS) before attempting to transmit a PS-POLL request 612, 616, or 620 to AP 608. A calculated AEIFS may prevent each STA 602, 604, and 606 from transmitting a request until the AEIFS duration has expired. Once the AEIFS has passed, the STA 602, 604, and/or 606 may transmit the request if the channel is idle. If the channel is not idle, the STA 602, 604, and/or 606 may recalculate the AEIFS and repeat the above process. The STAs 602, 604, and/or 606 may not begin the AEIFS countdown until the channel is idle.

In some implementations, an initial duration of an AEIFS may be based on a position of the respective STA in the STA ordering. The duration of the AEIFS for a particular STA may change as other STAs transmit polling requests and/or as the AP transmits responses addressed to other STAs. For example, an initial duration of the AEIFS may be calculated by first summing a SIFS time, a maximum CW time, and a time it takes a STA 602, 604, or 606 to transmit a PS-POLL request 612, 616, or 620 to the AP 608. This sum may then be multiplied by the position of the respective STA in the STA ordering as may be defined in the TIM 610 bitmap sequence. The product is then summed with the DIFS time to generate the initial AEIFS duration. Once a channel is idle, the STA at issue may wait for the initial AEIFS period before determining whether to transmit a request.

In some implementations, once a STA detects a PS-POLL request from another STA that comes earlier in the STA ordering than the STA at issue or detects a response addressed to another STA that comes earlier in the STA ordering than the STA at issue, the STA at issue decrements the multiplication factor so as to reduce a duration of the AEIFS. In some embodiments, the decrement of the multiplication factor may also be determined by a special indication send by the AP 608 to all of the STAs 602, 604, and 606. The indication may be included in the response addressed to a STA 602, 604, and/or 606 or may be included in a dedicated frame sent for this purpose. For example, if the position of the STA at issue in the STA ordering is 3, the initial duration of the AEIFS may be based on the sum as described above multiplied by 3, and the product summed by the DIFS time. If the STA at issue detects either the PS-POLL request from a STA identified earlier in the TIM 610 bitmap sequence or a response address to a STA identified earlier in the TIM 610 bitmap sequence, then the STA at issue may decrement the 3 to a value of 2 and recalculate the AEIFS. In this way, a STA at issue may wait for the initial AEIFS period before determining whether to transmit a request. Once the initial AEIFS period has passed, if the channel is idle, then the STA at issue transmits the request. If the channel is not idle and the STA at issue detects one of the two messages as described above, then the STA at issue recalculates the AEIFS. Once the channel is again idle, the STA at issue then waits the recalculated AEIFS duration before determining whether to transmit the request and the process repeats until the STA at issue is able to transmit the request. In other embodiments, the STA may wait an additional period of time after the AEIFS duration has passed before attempting to transmit the request.

As shown in FIG. 6, after the AP 608 has completed transmitting the TIM 610, STAs 602, 604, and 606 begin to wait for the respective calculated AEIFS duration. Because STA 602 is first in the order of the three STAs, its AEIFS duration may be shorter than the others. For example, the AEIFS time 624 for STA 602 may be equal to the DIFS time because a position of the STA 602 in the order of STAs may be represented by a 0. Likewise, the AEIFS time 626 for STA 604 may be calculated with its position in the order of STAs represented by 1. The AEIFS time 628 for STA 606 may be calculated with its position in the order of STAs represented by 2. Since STAs 604 and 606 are still waiting when AEIFS time 624 passes, the channel is idle and STA 602 may transmit PS-POLL request 612 after its AEIFS time 624 has passed. The PS-POLL request 612 causes the AP 608 to generate and transmit a response 614. Because AEIFS time 626 and AEIFS time 628 passes while the response 614 is being transmitted, STAs 604 and 606 do not attempt to transmit a request to the AP 608. If STA 604 or 606 is a hidden node, then the STA may not detect the PS-POLL request 612 transmitted by STA 602. However, the STA will detect the response 614 and will thus recalculate its AEIFS duration according to the embodiments described herein. Likewise, if STA 604 or 606 is not a hidden node, then the STA may detect both the PS-POLL request 612 and the response 614, and may adjust its AEIFS accordingly.

Once the AP 608 has completed its transmission of the response 614, STAs 604 and 606 may begin to wait for their respective AEIFS times 630 and 632. As described herein, once the AEIFS times 630 and 632 pass, the respective STA 604 and 606 checks the channel to determine whether a request can be transmitted. As illustrated in FIG. 6, STA 604 will determine that the channel is idle and transmit PS-POLL request 616, which may result in a response 618. The process described herein continues until STA 606 is able to transmit PS-POLL request 620. The STAs 602, 604, and 606 may wait an additional period of time, such as a contention window time, before attempting to transmit a request (not shown).

In this way, the use of the AEIFS may allow the wireless communications system to reduce the likelihood of collisions that may occur because of hidden nodes or other errors. A time that each STA waits before attempting to transmit a request may be independent of whether or not hidden nodes exist in the system. By basing a wait time at least partly on a position of a STA in a TIM bitmap sequence, each STA may wait for a unique time period before attempting to transmit a request. The use of the AEIFS may allow the wireless communications system to achieve reductions in collisions without creating a longer slot time and without increasing power consumption by the STAs and/or AP.

Figure 7:
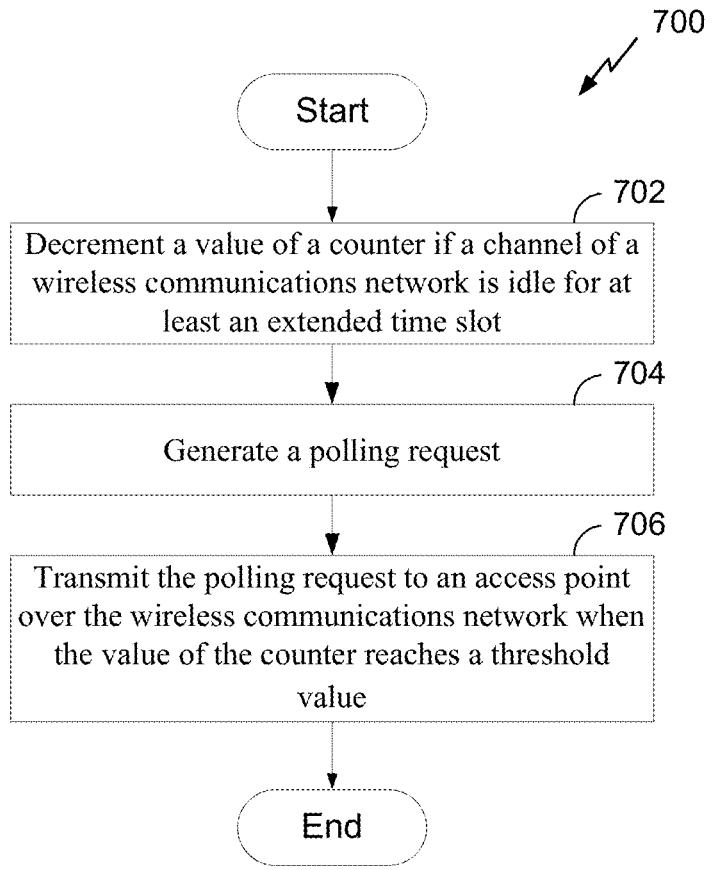
FIG. 7 is a flowchart of a process for reducing collisions in the wireless communication system of FIG. 1.

FIG. 7 is a flowchart of a process 700 for reducing collisions in the wireless communications system of FIG. 1. At block 702, the process 700 decrements a value of a counter if a channel of a wireless communications network is idle for at least an extended time slot. In an embodiment, a starting value of the counter is based on a position of an index corresponding to a wireless communications device in an information element, such as a TIM. At block 704, the process 700 generates a polling request, such as a PS-POLL request. At block 706, the process 700 transmits the polling request to an access point over the wireless communications network when the value of the counter reaches a threshold value. After block 706, the process 700 ends.

Figure 8:
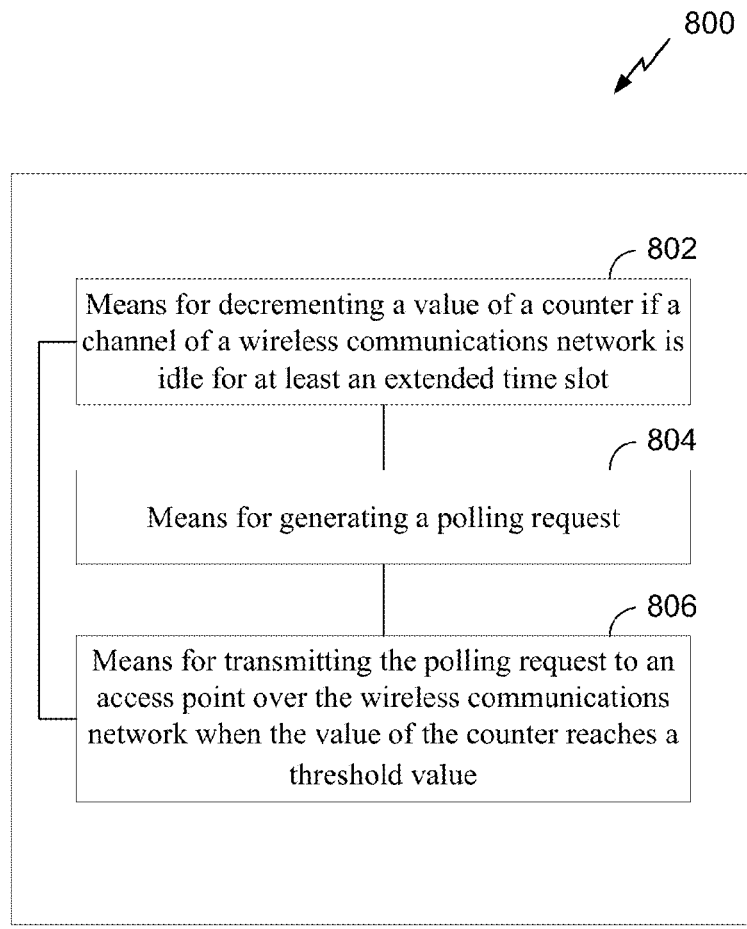
FIG. 8 is a functional block diagram of an exemplary wireless device that may be employed within the wireless communication system of FIG. 1.

FIG. 8 is a functional block diagram of an exemplary wireless device 800 that may be employed within the wireless communication system 100. The device 800 includes means 802 for decrementing a value of a counter if a channel of a wireless communications network is idle for at least an extended time slot. In an embodiment, means 802 for decrementing a value of a counter if a channel of a wireless communications network is idle for at least an extended time slot may be configured to perform one or more of the functions discussed above with respect to block 702. The device 800 further includes means 804 for generating a polling request. In an embodiment, means 804 for generating a polling request may be configured to perform one or more of the functions discussed above with respect to block 704. The device 800 further includes means 806 for transmitting the polling request to an access point over the wireless communications network when the value of the counter reaches a threshold value. In an embodiment, means 806 for transmitting the polling request to an access point over the wireless communications network when the value of the counter reaches a threshold value may be configured to perform one or more of the functions discussed above with respect to block 706.

Figure 9:
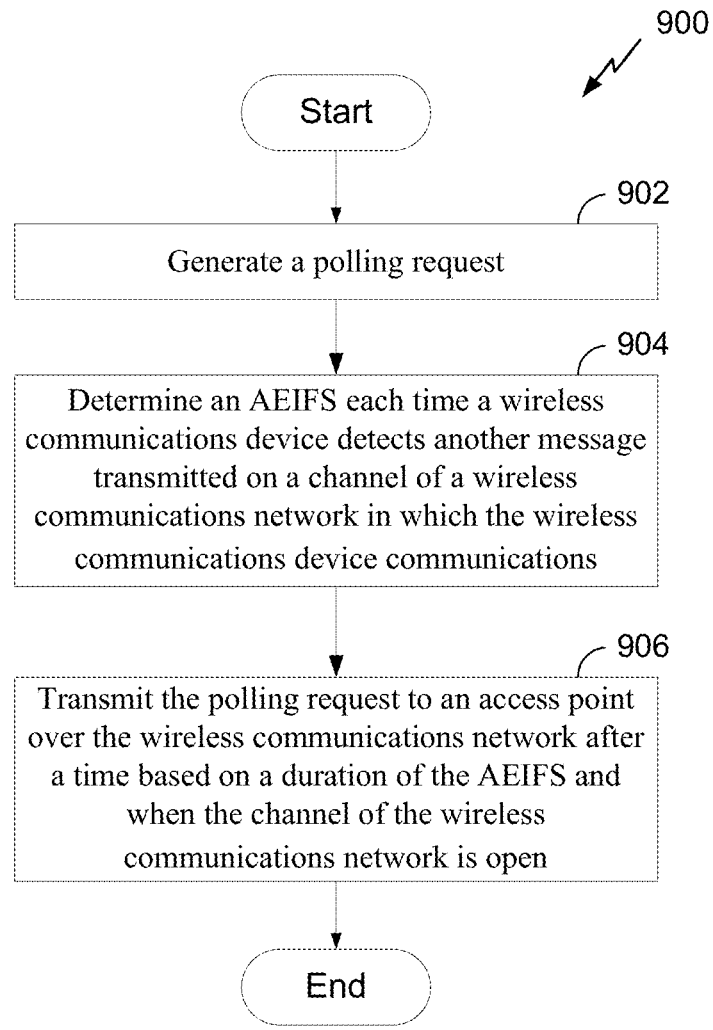
FIG. 9 is another flowchart of a process for reducing collisions in the wireless communication system of FIG. 1.

FIG. 9 is another flowchart of a process 900 for reducing collisions in the wireless communications system of FIG. 1. At block 902, the process 900 generates a polling request, such as a PS-POLL request. At block 904, the process 900 determines an adaptive enhanced inter-frame space (AEIFS) each time a wireless communications device detects another message transmitted on a channel of a wireless communications network in which the wireless communications device communicates. In an embodiment, an initial duration of the AEIFS is based on a position of the wireless communication device in an information element. At block 906, the process 900 transmits the polling request to an access point over the wireless communications network after a time based on a duration of the AEIFS and when the channel of the wireless communications network is open. After block 906, the process 900 ends.

Figure 10:
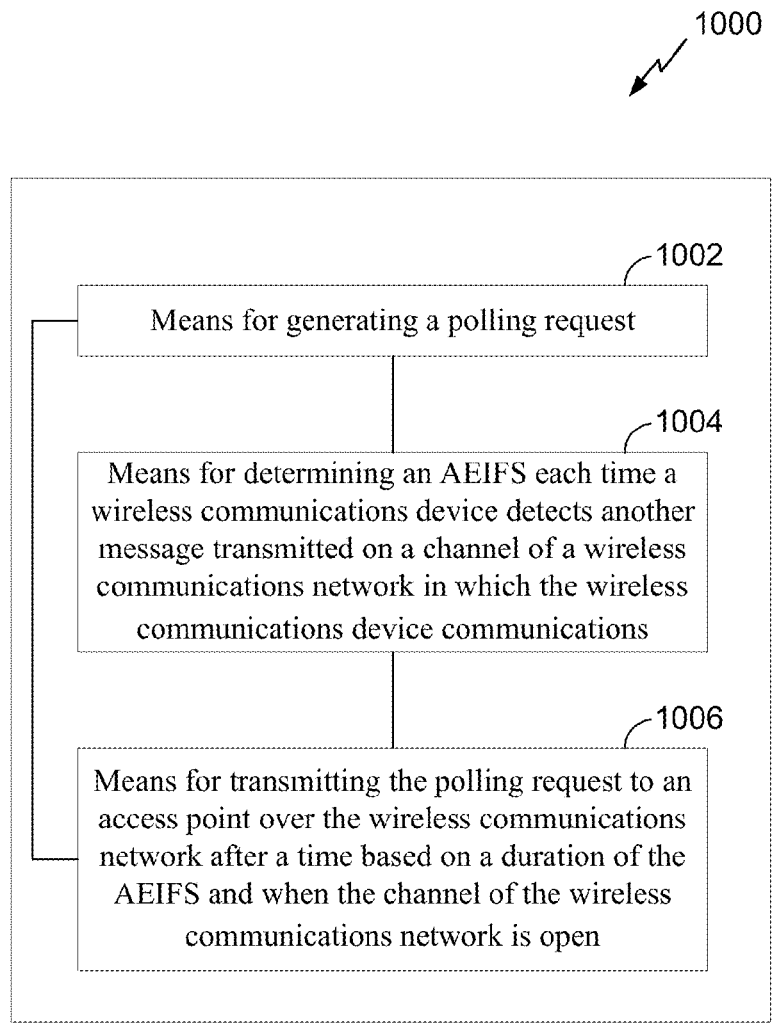
FIG. 10 is another functional block diagram of an exemplary wireless device that may be employed within the wireless communication system of FIG. 1.

FIG. 10 is a functional block diagram of an exemplary wireless device 1000 that may be employed within the wireless communication system 100. The device 1000 includes means 1002 for generating a polling request. In an embodiment, means 1002 for generating a polling request may be configured to perform one or more of the functions discussed above with respect to block 902. The device 1000 further includes means 1004 for determining an adaptive enhanced inter-frame space (AEIFS) each time a wireless communications device detects another message transmitted on a channel of a wireless communications network in which the wireless communications device communicates. In an embodiment, means 1004 for determining an AEIFS each time a wireless communications device detects another message transmitted on a channel of a wireless communications network in which the wireless communications device communicates may be configured to perform one or more of the functions discussed above with respect to block 904. The device 1000 further includes means 1006 for transmitting the polling request to an access point over the wireless communications network after a time based on a duration of the AEIFS and when the channel of the wireless communications network is open. In an embodiment, means 1006 for transmitting the polling request to an access point over the wireless communications network after a time based on a duration of the AEIFS and when the channel of the wireless communications network is open may be configured to perform one or more of the functions discussed above with respect to block 1006.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A wireless communications device comprising:
a memory configured to store a value of a counter; and
a processor coupled to the memory, the processor configured to decrement the value of the counter if a channel of a wireless communications network is idle for at least an extended slot time, and configured to generate a polling request, wherein the polling request is transmitted to an access point over the wireless communications network when the value of the counter reaches a threshold value, wherein an information element is a traffic indication map (TIM) comprising a bitmap, each bit in the bitmap corresponding to a different wireless communications device in the wireless communications network, and wherein a starting value of the counter is based on a number of bits corresponding to other wireless communications devices that appear before a bit corresponding to the wireless communication device.

2. The wireless communications device of claim 1, wherein the extended slot time is based on a duration of a polling request, a duration of a short inter-frame space (SIFS), and a duration of a clear channel assessment (CCA).

3. The wireless communications device of claim 1, further comprising a receiver electronically coupled to the processor and configured to sense messages from the access point, wherein the counter is configured to maintain the value of the counter when the receiver senses a message from the access point.

4. The wireless communications device of claim 1, wherein the access point reserves access to a medium for a group of wireless communications devices indicated in the information element.

5. The wireless communications device of claim 4, wherein access to the medium is reserved by setting a duration field value of a physical layer data unit (PPDU) carrying the information element, and wherein setting the duration field value prompts wireless communications devices not indicated in the information element to set a network allocation vector.

6. The wireless communications network of claim 4 wherein wireless communications devices not indicated in the information element are not allowed to access the medium.

7. The wireless communications device of claim 1, wherein the threshold value is zero.

8. The wireless communications device of claim 1, wherein the extended slot time is based on a duration of a polling request, a duration of a SIFS, a duration of a CCA, and a duration of a maximum contention window.

9. The wireless communications device of claim 8 wherein the polling request is transmitted to the access point when the value of the counter reaches the threshold value, when the channel is idle, and after a first time, the first time based on an arbitration inter-frame spacing (AIFS) and a duration of a residual back-off.

10. A method for reducing collisions in a wireless communications network, the method comprising:

decrementing a value of a counter if a channel of a wireless communications network is idle for at least an extended slot time;

generating a polling request; and transmitting the polling request to an access point over the wireless communications network when the value of the counter reaches a threshold value, wherein an information element is a traffic indication map (TIM) comprising a bitmap, each bit in the bitmap corresponding to a different wireless communications device in the wireless communications network, and wherein a starting value of the counter is based on a number of bits corresponding to other wireless communications devices that appear before a bit corresponding to the wireless communication device.

11. The method of claim 10, wherein decrementing a value of a counter comprises decrementing the value if the channel is idle for at least a duration of a polling request, a duration of a short inter-frame space (SIFS), and a duration of a clear channel assessment (CCA).

12. The method of claim 10, further comprising sensing messages from the access point, wherein the counter is configured to maintain the value of the counter when a receiver senses a message from the access point.

13. The method of claim 10, wherein the access point reserves access to a medium for a group of wireless communications devices indicated in the information element.

14. The method of claim 13, wherein access to the medium is reserved by setting a duration field value of a physical layer data unit (PPDU) carrying the information element, and wherein setting the duration field value prompts wireless communications devices not indicated in the information element to set a network allocation vector.

15. The method of claim 13, wherein wireless communications devices not indicated in the information element are not allowed to access the medium.

16. The method of claim 10, wherein the threshold value is zero.

17. The method of claim 10, wherein decrementing a value of a counter comprises decrementing the value if the channel is idle for at least a duration of a polling request, a duration of a SIFS, a duration of a CCA, and a duration of a maximum contention window.

18. The method of claim 17, wherein transmitting the polling request comprises transmitting the polling request to the access point when the value of the counter reaches the threshold value, when the channel is idle, and after a first time, the first time based on an arbitration inter-frame spacing (AIFS) and a duration of a residual back-off.

19. An apparatus configured to reduce collisions in a wireless communications network, the apparatus comprising:

means for decrementing a value of a counter if a channel of a wireless communications network is idle for at least an extended slot time;

means for generating a polling request; and means for transmitting the polling request to an access point over the wireless communications network when the value of the counter reaches a threshold value, wherein an information element is a traffic indication map (TIM) comprising a bitmap, each bit in the bitmap corresponding to a different wireless communications device in the wireless communications network, and wherein a starting value of the counter is based on a number of bits corresponding to other wireless communications devices that appear before a bit corresponding to the wireless communication device.

20. The apparatus of claim 19, wherein means for decrementing a value of a counter comprises means for decrementing the value if the channel is idle for at least a duration of a polling request, a duration of a short inter-frame (SIFS), and a duration of a clear channel assessment (CCA).

21. The apparatus of claim 19, further comprising means for sensing messages from the access point, wherein the counter is configured to maintain the value of the counter when a receiver senses a message from the access point.

22. The apparatus of claim 19, wherein the access point reserves access to a medium for a group of wireless communications devices indicated in the information element.

23. The apparatus of claim 22, wherein access to the medium is reserved by setting a duration field value of a physical layer data unit (PPDU) carrying the information element, and wherein setting the duration field value prompts wireless communications devices not indicated in the information element to set a network allocation vector.

24. The apparatus of claim 22, wherein wireless communications devices not indicated in the information element are not allowed to access the medium.

25. The apparatus of claim 19, wherein the threshold value is zero.

26. The apparatus of claim 19, wherein means for decrementing a value of a counter comprises means for decrementing the value if the channel is idle for at least a duration of a polling request, a duration of a SIFS, a duration of a CCA, and a duration of a maximum contention window.

27. The apparatus of claim 26, wherein means for transmitting the polling request comprises means for transmitting the polling request to the access point when the value of the counter reaches the threshold value, when the channel is idle, and after a first time, the first time based on an arbitration inter-frame spacing (AIFS) and a duration of a residual back-off.

28. The apparatus of claim 19, wherein the means for decrementing and the means for generating comprise a processor, and wherein the means for transmitting comprises a transmitter.

29. A non-transitory computer-readable medium comprising code that, when executed, causes an apparatus to:

decrement a value of a counter if a channel of a wireless communications network is idle for at least an extended slot time;

generate a polling request; and transmit the polling request to an access point over the wireless communications network when the value of the counter reaches a threshold value, wherein an information element is a traffic indication map (TIM) comprising a bitmap, each bit in the bitmap corresponding to a different wireless communications device in the wireless communications network, and wherein a starting value of the counter is based on a number of bits corresponding to other wireless communications devices that appear before a bit corresponding to the wireless communication device.

30. The medium of claim 29, further comprising code that, when executed, causes the apparatus to decrement the value if the channel is idle for at least a duration of a polling request, a duration of a short inter-frame space (SIFS), and a duration of a clear channel assessment (CCA).

31. The medium of claim 29, further comprising code that, when executed, causes the apparatus to sense messages from the access point, wherein the counter is configured to maintain the value of the counter when a receiver senses a message from the access point.

32. The medium of claim 29, wherein the access point reserves access to a second medium for a group of wireless communications devices indicated in the information element.

33. The medium of claim 32, wherein access to the second medium is reserved by setting a duration field value of a physical layer data unit (PPDU) carrying the information element, and wherein setting the duration field value prompts wireless communications devices not indicated in the information element to set a network allocation vector.

34. The medium of claim 32, wherein wireless communications devices not indicated in the information element are not allowed to access the second medium.

35. The medium of claim 29, wherein the threshold value is zero.

36. The medium of claim 29, further comprising code that, when executed, causes the apparatus to decrement the value if the channel is idle for at least a duration of a polling request, a duration of a SIFS, a duration of a CCA, and a duration of a maximum contention window.

37. The medium of claim 36, further comprising code that, when executed, causes the apparatus to transmit the polling request to the access point when the value of the counter reaches the threshold value, when the channel is idle, and after a first time, the first time based on an arbitration inter-frame spacing (AIFS) and a duration of a residual back-off.

38. A wireless communications device comprising:
a receiver configured to detect messages transmitted on a channel of a wireless communications network; and
a processor coupled to the receiver, the processor configured to generate a polling request and configured to determine an adaptive enhanced inter-frame space (AEIFS) each time the receiver detects another message transmitted on the channel of the wireless communications network in which the wireless communications device communicates, wherein the polling request is transmitted to an access point over the wireless communications network after a time based on a duration of the AEIFS and when the channel of the wireless communications network is open, wherein an information element is a traffic indication map (TIM) comprising a bitmap, each bit in the bitmap corresponding to a different wireless communications device in the wireless communications network, and wherein an initial duration of the AEIFS is based on a number of bits corresponding to other wireless communications devices that appear before a bit corresponding to the wireless communication device.

39. The wireless communications device of claim 38, wherein the duration of the AEIFS is based on a duration of a distributed coordinate function inter-frame space (DIFS), a duration of a short inter-frame space (SIFS), a duration of a maximum contention window, a transmit time of a polling request, and a number of messages transmitted by the access point addressed to other wireless communications devices that correspond to a bit that appears before the bit corresponding to the wireless communications device.

40. The wireless communications device of claim 39, wherein the duration of the AEIFS decreases as the number of messages transmitted by the access point addressed to other wireless communications devices that correspond to a bit that appears before the bit corresponding to the wireless communications device increases.

41. The wireless communications device of claim 40, further comprising a transmitter configured to transmit the polling request when the access point has addressed a message to each other wireless communications device that corresponds to a bit that appears before the bit corresponding to the wireless communications device.

42. A method for reducing collisions in a wireless communications network, the method comprising:
generating a polling request;
determining an adaptive enhanced inter-frame space (AEIFS) each time a wireless communications device detects another message transmitted on a channel of a wireless communications network in which the wireless communications device communicates; and
transmitting the polling request to an access point over the wireless communications network after a time based on a duration of the AEIFS and when the channel of the wireless communications network is open, wherein an information, element is a traffic indication map (TIM) comprising a bitmap, each bit in the bitmap corresponding to a different wireless communications device in the wireless communications network, and wherein an initial duration of the AEIFS is based on a number of bits corresponding to other wireless communications devices that appear before a bit corresponding to the wireless communication device.

43. The method of claim 42, further comprising determining a duration of the AEIFS based on a duration of a distributed coordinate function inter-frame space (DIFS), a duration of a short inter-frame space (SIFS), a duration of a maximum contention window, a transmit time of a polling request, and a number of messages transmitted by the access point addressed to other wireless communications devices that correspond to a bit that appears before the bit corresponding to the wireless communications device.

44. The method of claim 43, further comprising decreasing the duration of the AEIFS as the number of messages transmitted by the access point addressed to other wireless communications devices that correspond to a bit that appears before the bit corresponding to the wireless communications device increases.

45. The method of claim 44, wherein transmitting the polling request comprises transmitting the polling request when the access point has addressed a message to each other wireless communications device that corresponds to a bit that appears before the bit corresponding to the wireless communications device.

46. An apparatus configured to reduce collisions in a wireless communications network, the apparatus comprising:
means for generating a polling request;
means for determining an adaptive enhanced inter-frame space (AEIFS) each time a wireless communications device detects another message transmitted on a channel of a wireless communications network in which the wireless communications device communicates; and
means for transmitting the polling request to an access point over the wireless communications network after a time based on a duration of the AEIFS and when the channel of the wireless communications network is open, wherein an information element is a traffic indication map (TIM) comprising a bitmap, each bit in the bitmap corresponding to a different wireless communications device in the wireless communications network, and wherein an initial duration of the AEIFS is based on a number of bits corresponding to other wireless communications devices that appear before a bit corresponding to the wireless communication device.

47. The apparatus of claim 46, further comprising means for determining a duration of the AEIFS based on a duration of a distributed coordinate function inter-frame space (DIFS), a duration of a short inter-frame space (SIFS), a duration of a maximum contention window, a transmit time of a polling request, and a number of messages transmitted by the access point addressed to other wireless communications devices that correspond to a bit that appears before the bit corresponding to the wireless communications device.

48. The apparatus of claim 47, further comprising means for decreasing the duration of the AEIFS as the number of messages transmitted by the access point addressed to other wireless communications devices that correspond to a bit that appears before the bit corresponding to the wireless communications device increases.

49. The apparatus of claim 48, wherein means for transmitting the polling request comprises means for transmitting the polling request when the access point has addressed a message to each other wireless communications device that corresponds to a bit that appears before the bit corresponding to the wireless communications device.

50. The apparatus of claim 46, wherein the means for generating and the means for determining comprise a processor, and wherein the means for transmitting comprise a transmitter.

51. A non-transitory computer-readable medium comprising code that, when executed, causes an apparatus to:
  generate a polling request;
  determine an adaptive enhanced inter-frame space (AEIFS) each time a wireless communications device detects another message transmitted on a channel of a wireless communications network in which the wireless communications device communicates; and
  transmit the polling request to an access point over the wireless communications network after a time based on a duration of the AEIFS and when the channel of the wireless communications network is open, wherein an information element is a traffic indication map (TIM) comprising a bitmap, each bit in the bitmap corresponding to a different wireless communications device in the wireless communications network, and wherein an initial duration of the AEIFS is based on a number of bits corresponding to other wireless communications devices that appear before a bit corresponding to the wireless communication device.

52. The medium of claim 51, further comprising code that, when executed, causes the apparatus to determine a duration of the AEIFS based on a duration of a distributed coordinate function inter-frame space (DIFS), a duration of a short inter-frame space (SIFS), a duration of a maximum contention window, a transmit time of a polling request, and a number of messages transmitted by the access point addressed to other wireless communications devices that correspond to a bit that appears before the bit corresponding to the wireless communications device.

53. The medium of claim 52, further comprising code that, when executed, causes the apparatus to decrease the duration of the AEIFS as the number of messages transmitted by the access point addressed to other wireless communications devices that correspond to a bit that appears before the bit corresponding to the wireless communications device increases.

54. The medium of claim 53, further comprising code that, when executed, causes the apparatus to transmit the polling request comprises means for transmitting the polling request when the access point has addressed a message to each other wireless communications device that corresponds to a bit that appears before the bit corresponding to the wireless communications device.

* * * * *